UNITED STATES PATENT OFFICE.

HENRY C. HUMPHREY, OF STAMFORD, CONNECTICUT, ASSIGNOR TO EDWARD E. QUIMBY, (TRUSTEE,) OF NEW YORK, N. Y.

IMPROVEMENT IN MANUFACTURE OF GLUCOSE.

Specification forming part of Letters Patent No. 220,150, dated September 30, 1879; application filed December 28, 1878.

*To all whom it may concern:*

Be it known that I, HENRY C. HUMPHREY, of Stamford, Connecticut, have invented a certain Improvement in the Manufacture of Glucose, of which the following is a specification.

My improvement consists in the direct treatment of corn and other vegetable products containing starch with a solution of an organic acid, such as oxalic or tartaric acid, whereby the free sugar and starchy matter present are converted directly into glucose or a mixture of glucose, dextrine, or other compound, resulting from the action of an organic acid upon starchy matter.

The advantages of my method of manufacturing glucose are as follows: First, the light color of the sirup, which results from the substitution of an organic acid in place of the mineral acids, which alone have heretofore been tried in the manufacture of glucose from cereals, and which impart a dark color to the sirup; second, the increased yield of glucose, which results from manufacturing it directly from the corn, and thereby incorporating in it all the sugar already formed in the corn, and also all the sugar formed by the conversion of the starchy matter present, instead of, as heretofore, first extracting the starch by one operation, and then, by a second operation, converting the starch into glucose, and thereby losing a certain percentage of starch and sugar, which are left in the solution or in the residuum of the first operation; third, economy in cost, owing to dispensing with the usual preliminary operation of extracting the starch and to the increased yield; fourth, greater sweetness of the glucose, resulting from the retention in it of the sugar already formed in the corn, which has been heretofore dissolved and lost in the usual preliminary operation of extracting the starch from the corn; fifth, the absence from the liquors of sulphate of lime or other mineral salts, which are difficult of removal and which are deleterious in character, while, on the contrary, oxalate of lime, which is formed in my process, is harmless and capable of easy and thorough removal; sixth, avoidance of the bitter taste produced by the action of mineral acid upon the albumenoids or other organic substances of the corn; seventh, the production of a glucose which is not liable to ferment.

My improvement is carried out in the following manner: The grain is ground and then mixed with about twice its weight of water. The whole mass is heated. A sweet water may be substituted for water. In a vat furnished with steam-coil, stirrer, &c., a quantity of oxalic or other organic acid equivalent to four pounds, more or less, for every bushel of grain treated, is dissolved in a weight of water equal to about twice the weight of corn. This solution is boiled, and into it is poured gradually the mixture of grain and water above mentioned. The whole mass is then boiled until the desired conversion is obtained.

The state of the conversion is to be learned by the application of the ordinary tests for starch and dextrine, such as iodine solution and alcohol.

The woody fiber and organic material left undissolved is now separated from the solution by filtration and washing. Filter-bags, filter-frames, suction-filters, or any other means may be used for this separation. (For further treatment of this residue see below.) The filtrate is now treated with carbonate of lime and lime, or other alkaline earth, to precipitate from the solution the acid in the form of an alkaline salt, and also to separate certain other organic substances. The whole is now filtered. (For the treatment of this precipitate see below.) Should the filtrate be alkaline, it is now slightly acidified, then evaporated in an open pan or in a vacuum-pan to about 22° Baumé. It is now run through the bone-black. The sirup may be here clarified by blood or otherwise. Sulphurous acid may be used in decolorizing the sirup. The liquor is then evaporated to the required density.

Treatment of the first residue, consisting of woody fiber and other organic matter: The mass is stirred up in water and again filtered, the solution being used as a sweet water. The residue is treated with lime or by any other substance whereby the free acid therein contained may be neutralized or removed.

Treatment of residue consisting of the organic salts of lime and other organic matter: The mass is washed with a weak solution of acid, which is sufficient in strength to dissolve the organic matter, or portion of it other than the organic salts of lime, and then filtered. The undissolved residue is now decomposed by the proper acid, the organic acid being made free. The latter, which remains in solution, is filtered off and purified. The purified acid is then to be used for a second operation.

Instead of conducting the operation in an open vessel it may be performed in a closed vessel under pressure, with or without agitation, in the following manner: The whole unground cereal or other vegetable product is heated, and, if preferred, agitated in a closed vessel under pressure with water and an organic acid until the proper conversion is completed.

The subsequent operations are the same as in the first method after the conversion has been completed.

I claim as my invention—

In the manufacture of glucose, the hereindescribed process of making directly from the corn or other starchy vegetable product treated a sweet light-colored glucose not easily liable to fermentation, which consists in boiling the corn or other vegetable product in an aqueous solution of oxalic or other organic acid, then filtering the liquor, and precipitating the acid therefrom by means of lime or other alkaline earth, and then clarifying, decolorizing, and evaporating the liquor, substantially as described.

H. C. HUMPHREY.

Witnesses:
M. L. ADAMS,
ASA FARR.